Figure 1:
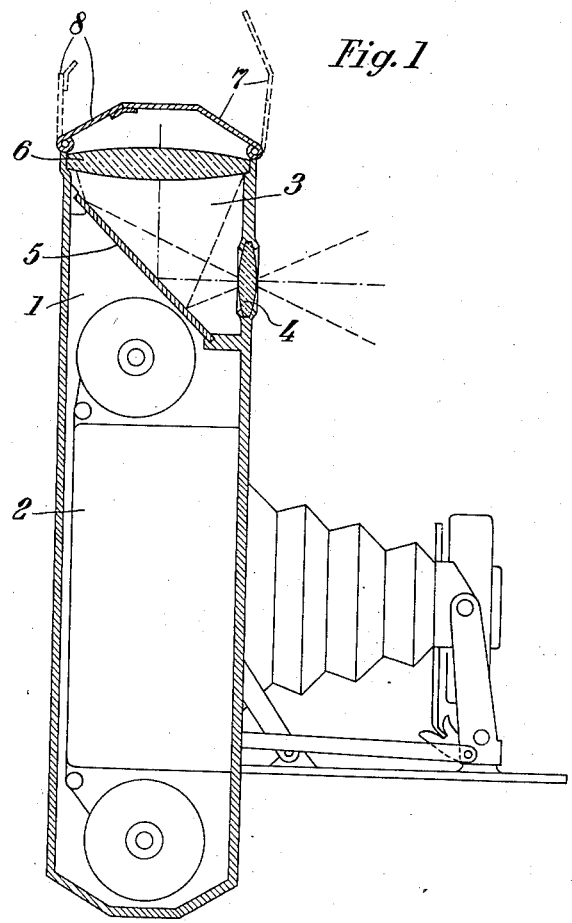

Nov. 17, 1936.   L. GOLDHAMMER   2,060,933
CAMERA
Filed Nov. 2, 1933   2 Sheets-Sheet 1

Inventor:
Leo Goldhammer,
By Attorney
Philip S. Hopkins.

Nov. 17, 1936.  L. GOLDHAMMER  2,060,933
CAMERA
Filed Nov. 2, 1933  2 Sheets—Sheet 2
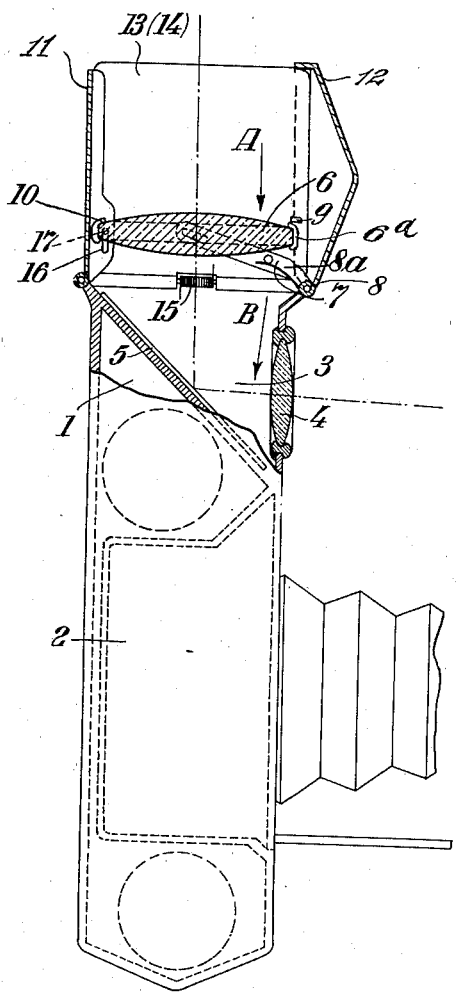
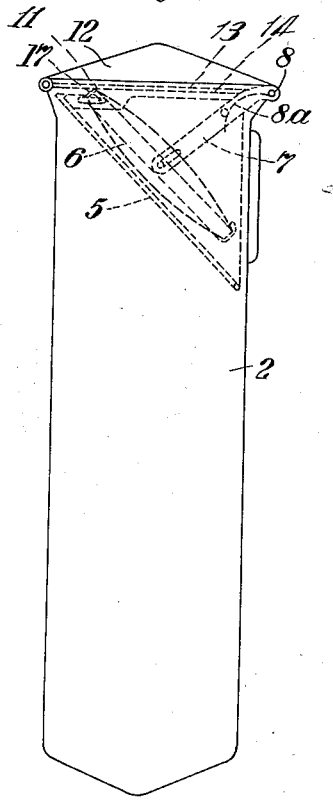
Inventor:
Leo Goldhammer
By Attorney
Philip S. Hopkins Patented Nov. 17, 1936

2,060,933

UNITED STATES PATENT OFFICE 2,060,933

CAMERA

Leo Goldhammer, Munich, Germany, assignor to Agfa Ansco Corporation, Binghamton, N. Y., a corporation of New York Application November 2, 1933, Serial No. 696,424
In Germany November 5, 1932

6 Claims. (Cl. 88—1.5)

My present invention relates to a camera and more particularly to a folding camera.

One of its objects is to provide a folding camera in which the brilliant finder is arranged in an improved manner. Further objects will be seen from the detailed specification following hereafter. Reference is made to the accompanying drawings in which Fig. 1 is a section through the casing of a folding camera having the brilliant finder mounted inside the camera body, Fig. 2 is a lateral view of a camera partially in section showing another embodiment of my invention, Fig. 3 is a lateral view of the camera shown in Fig. 2 in closed condition.

Hitherto the brilliant finder is generally rotatably mounted on the lens front of a camera and so that it can be folded thereon. When mounting the brilliant finder in this manner it may be difficult to fold the baseboard on the camera body, because in the case of the brilliant finder being but slightly turned out of its normal position, the camera cannot be closed; the cable release placed round the finder may increase the troubles. When closing the camera by force it may easily occur that the means holding the finder is deformed, so that the picture section viewed through the finder corresponds no longer to that focussed by the camera. In addition, on account of the limited space available, the field viewed in the finder had to be comparatively small, so that the finder picture could but badly be discerned.

In order to overcome these drawbacks according to the present invention the brilliant finder is mounted inside the casing of the folding camera. When mounting the brilliant finder in this way, the part of the camera casing lying on top of said finder may form in the operative position of the finder an observing hood, whereby the detrimental lateral incidence of light can be avoided. Another advantage resides in the fact that the operator must not bow so much on the camera when taking a picture since the opening for viewing the finder lies immediately below the eye when the camera is hung round.

With a brilliant finder according to this invention the finder lens which is nearest the eye may be given such dimensions that its picture field has the size of at least one third of the picture section focussed on the light sensitive material. By mounting the finder lens facing the eye so that it is out of the camera casing in its operative position, the finder lens may have a diameter greater than the width of the camera. The finder lens facing the eye is tiltable in such a manner that it lies parallel to the finder mirror when the camera is closed, whereas it lies outside the camera casing when in the proper position for focussing.

In the camera represented in Fig. 1, the brilliant finder 3 is mounted inside the folding camera 2 above the spool chamber 1. The brilliant finder, as is known, consists of the finder lens 4 facing the object to be taken, of the finder mirror 5 and of the lens 6 facing the eye of the operator. According to the invention the diameter of the lens 6 is chosen as large as possible, in order that the object to be taken can be viewed in full detail. Above the finder lens 6 there are arranged two light shades 7 and 8 which preferably are unfolded together with the camera and which, when the camera is not used form part of the camera casing.

In the example of apparatus represented in Figs. 2 and 3, the finder lens is larger than is the width of the camera, in order to obtain the picture viewed through the finder in approximately the same size as has the picture focussed on the light sensitive material. In order that lens 6 may be folded into the camera casing, it is attached to the casing by means of a pair of pivotally mounted levers 7, which by a spring-urged hinge 8 guide automatically lens 6 connected with the levers by means of a pin and slot connection into its operative position when opening the light shades. By the spring 8a of the hinge 8 the lens is constantly pressed against the stops 9 and 10 provided on the light shades 11 and 12. For folding the finder lens 6, it must be pushed at the point indicated by the arrow A and at the same time the light shade 11 must be folded. In doing this, the lens at first merely turns about its pivoting point (cf. arrow B) and then slides in the direction of the mirror plane until it comes to lie approximately parallel to the mirror. Then the light shades are folded in the order of numbers 13, 14, 12. The light shade 12 which is folded last is preferably so constructed that the camera casing, after closing the observing hood assumes an approximately symmetrical form and the hood is retained in its closed condition by a snapping device, not represented. All of the light shades are under the influence of springs 15, so that, when the arresting means is released they automatically spring open. In the light shade 11 there is provided a slot 16 which co-operates with a pin 17 fitted on the lens mount 6a, so that the finder lens 6 can give way in folding it and flap 12 likewise can be folded.

What I claim is:

1. In a folding camera in combination, a camera casing having a back wall and a front wall, an upper and a lower spool for winding roll film and having a diameter substantially equal to the width of said camera casing, a mirror arranged above said upper spool fastened to said front wall and said back wall and inclined to these walls, an objective lens provided in said front wall in front of said inclined mirror for focussing an object to be photographed on said mirror, an eye lens having a diameter at least equal to the width of said camera casing and mounted above said inclined mirror for viewing said object focussed on said mirror by said objective lens, and means for securing said eye lens to said casing.

2. In a folding camera in combination, a camera casing having a back wall and a front wall, an upper and a lower spool for winding roll film and having a diameter substantially equal to the width of said camera casing, a mirror arranged above said upper spool fastened to said front wall and said back wall and inclined to these walls, an objective lens provided in said front wall in front of said inclined mirror for focussing an object to be photographed on said mirror, recesses in the front wall and the back wall of said camera casing and above said mirror, an eye lens having a diameter equal to the width of said camera casing inserted in said recesses, and two flaps hinged to said walls of said camera casing, said hinges fixing said eye lens in said recesses, and said flaps protecting said eye lens in the folded state and forming a light shaft when unfolded.

3. In a folding camera in combination, a camera casing having a back wall and a front wall, an upper and a lower spool for winding roll film and having a diameter substantially equal to the width of said camera casing, a mirror arranged above said upper spool fastened to said front wall and said back wall and inclined to these walls, an objective lens provided in said front wall in front of said inclined mirror for focussing an object to be photographed on said mirror, an eye lens having a diameter greater than the width of said camera casing and mounted above said inclined mirror for viewing said object focussed on said mirror by said objective lens, means for securing said eye lens to said casing, and means for folding said eye lens into said camera casing.

4. In a folding camera in combination, a camera casing having a back wall and a front wall, an upper and a lower spool for winding roll film and having a diameter substantially equal to the width of said camera casing, a mirror arranged above said upper spool fastened to said front wall and said back wall and inclined to these walls, an objective lens provided in said front wall in front of said inclined mirror for focussing an object to be photographed on said mirror, a plate hinged to the upper end of said back wall, an eye lens having a diameter greater than is the width of said camera casing, means for rotatably connecting said eye lens with said plate and means for turning said eye lens for folding it into said camera casing.

5. In a folding camera in combination, a camera casing having a back wall and a front wall, an upper and a lower spool for winding roll film and having a diameter substantially equal to the width of said camera casing, a mirror arranged above said upper spool fastened to said front wall and said back wall and inclined to these walls, an objective lens provided in said front wall in front of said inclined mirror for focussing an object to be photographed on said mirror, a plate hinged to the upper end of said back wall and bent on both sides to form projections perpendicularly to said walls of said casing, slots provided in said projections, an eye lens having a diameter greater than is the width of said camera casing, pins secured to said eye lens and engaging said slots in said projections, and means for turning said eye lens about said pins for folding it into said camera casing.

6. In a folding camera in combination, a camera casing having a back wall and a front wall, an upper and a lower spool for winding roll film and having a diameter substantially equal to the width of said camera casing, a mirror arranged above said upper spool fastened to said front wall and said back wall and inclined to these walls, an objective lens provided in said front wall in front of said inclined mirror for focussing an object to be photographed on said mirror, a plate hinged to the upper end of said back wall and bent on both sides to form projections perpendicularly to said walls of said casing, slots provided in said projections, a second plate hinged to the upper end of said front wall, a lever pivotally connected to the upper end of said front wall, a slot provided near the free end of said lever, a pin on said eye lens engaging said slot in said lever, a stop on said second plate, a pin on said lever, a spring fastened to said front wall and engaging said pin, thus pressing said eye lens against said stop, said lever folding said eye lens into said camera on pressing said first plate towards the front wall of said casing after pushing said eye lens at the end at which it engages said stop towards the interior of said casing.

LEO GOLDHAMMER.